(12) United States Patent
Baskar (10) Patent No.: US 11,544,469 B2
(45) Date of Patent: Jan. 3, 2023

(54) ELECTRONIC APPARATUS AND CONTROL METHOD THEREOF

(71) Applicant: SAMSUNG ELECTRONICS CO., LTD., Suwon-si (KR)

(72) Inventor: Rajasimhan Baskar, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 105 days.

(21) Appl. No.: 16/961,137

(22) PCT Filed: Jan. 2, 2019

(86) PCT No.: PCT/KR2019/000030
§ 371 (c)(1),
(2) Date: Jul. 9, 2020

(87) PCT Pub. No.: WO2019/164119
PCT Pub. Date: Aug. 29, 2019

(65) Prior Publication Data
US 2020/0356728 A1    Nov. 12, 2020

(30) Foreign Application Priority Data

Feb. 22, 2018  (KR) .................. 10-2018-0021163

(51) Int. Cl.
*G06F 40/30*        (2020.01)
*G06F 16/951*       (2019.01)
(Continued)

(52) U.S. Cl.
CPC ............ *G06F 40/30* (2020.01); *G06F 16/951* (2019.01); *G06F 17/18* (2013.01); *G06F 40/44* (2020.01)

(58) Field of Classification Search
CPC ........ G06F 40/30; G06F 16/951; G06F 17/18; G06F 40/44; G06Q 30/0631; G06Q 50/01; G06Q 30/0282
See application file for complete search history.

(56) References Cited

U.S. PATENT DOCUMENTS 8,671,098 B2   3/2014   Salvetti et al.
9,118,763 B1   8/2015   Margulies et al.
(Continued)

FOREIGN PATENT DOCUMENTS

JP    2004-145433        5/2004
JP    2004145433  A  *  5/2004  ............. G06F 17/27
(Continued)

OTHER PUBLICATIONS

Kontopoulos Efstratios et al: "Ontology-based sentiment analysis of twitter posts", Expert Systems With Applications, Oxford, GB, vol. 40, No. 10, Jan. 18, 2013 (Jan. 18, 2013), pp. 4065-4074, XP028991694, ISSN: 0957-4174, DOE 10. 1016/ALESWA., (Year: 2013).*

Da Silva Nadia F F et al: "Tweet sentiment analysis with classifier ensembles", Decision Support Systems, Elsevier Science Publishers, Amsterdam, NL, vol. 66, 24 duly 2074 (Jul. 24, 2014), pp. 170-179, XP029075474, ISSN: 0167-9236 , DOL 10.1016/. DSS. (Year: 2014).*

(Continued)

*Primary Examiner* — Fariba Sirjani
(74) *Attorney, Agent, or Firm* — Nixon & Vanderehye, P.C.

(57) ABSTRACT

An electronic apparatus is disclosed. The electronic apparatus includes a display, a storage in which keyword information by product specification is stored, and a processor configured to obtain user feedback on the product by crawling a website, identify positive feedback or negative feedback among the user feedback corresponding to the keyword information by specification by performing natural language (Continued)

processing (NLP) to which at least two different algorithms are applied, and display a result of the identification through the display.

13 Claims, 7 Drawing Sheets

(51) Int. Cl.
  *G06F 40/44* (2020.01)
  *G06F 17/18* (2006.01)

(56) References Cited

U.S. PATENT DOCUMENTS

| | | | |
|---|---|---|---|
| 9,201,863 | B2 | 12/2015 | Duong-Van |
| 9,317,566 | B1 | 4/2016 | L'Huillier et al. |
| 9,582,264 | B1 | 2/2017 | Anbil Parthipan et al. |
| 9,741,058 | B2 | 8/2017 | L'Huillier et al. |
| 9,857,946 | B2 * | 1/2018 | Chowdhury .......... G06F 40/258 |
| 10,002,371 | B1 * | 6/2018 | Baker ............... G06F 16/24578 |
| 10,282,737 | B2 * | 5/2019 | Clark ....................... G06F 40/30 |
| 10,410,224 | B1 * | 9/2019 | Levanon ................ G06Q 30/02 |
| 2008/0249764 | A1 * | 10/2008 | Huang ..................... G06F 40/30 704/9 |
| 2010/0119053 | A1 | 5/2010 | Goeldi |
| 2010/0125496 | A1 | 5/2010 | Wong |
| 2012/0101808 | A1 * | 4/2012 | Duong-Van ............. G06F 40/30 704/9 |
| 2014/0164061 | A1 | 6/2014 | Sterne et al. |
| 2015/0088608 | A1 | 3/2015 | Cama et al. |
| 2015/0331563 | A1 * | 11/2015 | Chowdhury .......... G06F 40/258 715/765 |
| 2016/0042359 | A1 * | 2/2016 | Singh ...................... G06F 40/30 704/2 |
| 2016/0267377 | A1 | 9/2016 | Pan et al. |
| 2017/0091841 | A1 * | 3/2017 | Cunico ............. G06F 16/90324 |
| 2017/0124575 | A1 * | 5/2017 | Clark ................ G06F 16/24578 |
| 2017/0200205 | A1 | 7/2017 | Liu et al. |
| 2017/0243120 | A1 | 8/2017 | Doan et al. |
| 2020/0356728 | A1 * | 11/2020 | Baskar .................... G06F 17/18 |

FOREIGN PATENT DOCUMENTS

| | | |
|---|---|---|
| KR | 10-0956498 | 5/2010 |
| KR | 10-2011-0044112 | 4/2011 |
| KR | 10-2012-0014277 | 2/2012 |
| KR | 10-2012-0035100 | 4/2012 |
| KR | 10-1134701 | 4/2012 |
| KR | 10-2012-0047079 | 5/2012 |
| KR | 10-1487871 | 2/2015 |
| KR | 10-1647087 | 8/2016 |
| KR | 10-1730340 | 4/2017 |
| KR | 10-2017-0073424 | 6/2017 |
| KR | 10-2017-0090370 | 8/2017 |
| WO | 2013/049774 | 4/2013 |

OTHER PUBLICATIONS

Onan Aytug et al: "A multicbiective weighted voting ensemble classifier based on differential evolution algorithm for text sentiment classification", Expert Systems With Applications, Oxford, GB, vol. 62, Jun. 7, 2016 (Jun. 7, 2016), pp. 1-16, XP029633815, (Year: 2016).*

Trotman et al: "Choosing document structure weights", Information Processing & Management, Elsevier, Barking, GB, vol. 41, No. 2, Mar. 1, 2005 (Mar. 1, 2005), pp. 243-264, XP0027769220, ISSN: 0306-4573 [retrieved on Mar. 1, 2005] (Year: 2005).*

Erik Boy et al: "A machine learning approach to sentiment analysis in multilingual Web texts", Information Retrieval, Kluwer Academic Publishers, BO, vol. 12, No. 5, Sep. 26, 2008 (Sep. 26, 2008), pp. 526-558, XP019730149, ISSN: 1573-7659 (Year: 2008).*

International Search Report for PCT/KR2019/000030 dated Apr. 17, 2019, 5 pages with English Translation.

Written Opinion of the ISA for PCT/KR2019/000030 dated Apr. 17, 2019, 9 pages with English Translation.

Extended Search Report dated Nov. 13, 2020 in counterpart European Patent Application No. 19757755.4.

Trotman et al., "Choosing Document Structure Weights," Information Processing & Management, Elsevier, Barking, GB, vol. 41, No. 2, Mar. 1, 2005, pp. 243-264 (22 pages).

Boiy, Erik et al., "A machine learning approach to sentiment analysis in multilingual Web texts," Information Retrieval, Kluwer Academic Publishers, BO, vol. 12, No. 5, Sep. 26, 2008, pp. 526-558 (33 pages).

Kontopoulos, Efstratios et al., "Ontology-based sentiment analysis of twitter posts," Expert Systems With Applications, Oxford, GB., vol. 40, No. 10, Jan. 18, 2013, pp. 4065-4074 (10 pages).

Da Silva, Nadia F.F. et al., "Tweet sentiment analysis with classifier ensembles," Decision Support Systems, Elsevier Science Publishers, Amsterdam, NL, vol. 66, Jul. 24, 2014, pp. 170-179 (10 pages).

Onan Aytug et al, "A multiobjective weighted voting ensemble classifier based on differential evolution algorithm or text sentiment classification," Expert Systems With Applicatoins, Oxford, GB, vol. 62, Jun. 7, 2016, pp. 1-16 (16 pages).

Communication pursuant to Article 94(3) EPC dated Mar. 3, 2022 in EP Application No. 19 757 755.4.

Notice of Preliminary Rejection dated Sep. 19, 2022 in Korean Patent Application No. 10-2018-0021163 and English-language translation.

* cited by examiner

| No | Spec | Keywords | Action |
|---|---|---|---|
| | Feature Configuration | | ADD |
| 1 | 3D unsupported | 3D,2d | Edit I Detete |
| 2 | Dolby Vision unsupported | Dolby Vision | Edit I Detete |
| 3 | Panel Type | Edge,FALD, OLED, curve*, Panel | Edit I Detete |
| 4 | Camera unsupported | Camera | Edit I Detete |
| 5 | install uneasy | setup,setting,hung, mount, wall, installation, setup,install, position, fitting, positioning, placing, placement | Edit I Detete |
| 6 | design | exterior, thickness | Edit I Detete |

★☆☆☆☆ Title : choosing this TV was a huge mistake
Recently purchased this TV ------------------------------------------
-------------------------------------------------- physical damage --
------------------- damage ----------

★☆☆☆☆ Title : NOT HAPPY
--------------------- It was that easy to damage -------------------
-------- damage ---------------------------------------------------
------------------

★★☆☆☆ Title : Slightly damaged
------------------------------------------------------------------
--------- slight damage ------------------------------------------
------------------------------------------------------------------

★☆☆☆☆ Title : Never got to use it but still have to pay for it!!
--------------------------------------- easy to damage -----------
---------

FIG. 6

ELECTRONIC APPARATUS AND CONTROL METHOD THEREOF

This application is the U.S. national phase of International Application No. PCT/KR2019/000030 filed Jan. 2, 2019 which designated the U.S. and claims priority to KR Patent Application No. 10-2018-0021163 filed Feb. 22, 2018, the entire contents of each of which are hereby incorporated by reference.

FIELD

The disclosure relates to an electronic apparatus and a control method. More particularly, the disclosure relates to an electronic apparatus which performs natural language processing (NLP) and a control method thereof.

DESCRIPTION OF RELATED ART

With the recent development of electronic technology, the size of online shopping markets through electronic apparatus has grown exponentially. As users cannot directly see, touch, or feel products, feedbacks, reviews, etc. of other users who purchased the products are very important in online shopping markets.

Recently, research on a method of applying a machine learning algorithm such as deep learning, etc. to feedback and reviews of users, and confirming a positive or negative evaluation of products by performing a big data analysis. For example, the artificial intelligence system may apply natural language processing (NLP) to various user feedbacks to identify positive or negative feedback for the product.

However, there were problems in that the identification result of the feedback has not matched the user's actual emotion (positive or negative) with respect to the product, and was not accurate. Accordingly, an identification method having a higher accuracy has been required.

SUMMARY

The object of the application is to provide an electronic apparatus that performs NLP on user feedback and identifies whether the feedback is positive or negative and a control method thereof.

According to an embodiment of the disclosure, an electronic apparatus includes a display, a storage in which keyword information by product specification is stored, and a processor configured to obtain user feedback on the product by crawling a website, identify positive feedback or negative feedback among the user feedback corresponding to the keyword information by specification by performing natural language processing (NLP) to which at least two different algorithms are applied, and display a result of the identification through the display.

The user feedback may include feedback title and feedback contents, wherein the processor is configured to identify a first exposure frequency of a first positive word and a first negative word, respectively, included in the feedback title by performing NLP on the feedback title, identify a second exposure frequency of a second positive word and a second negative word, respectively, included in the feedback contents by performing NLP on the feedback contents, and identify the user feedback as positive feedback or negative feedback on the product by applying a weight higher than the second exposure frequency to the first exposure frequency.

The user feedback may further include rating information with respect to the product, and wherein the processor is configured to the user feedback as positive feedback or negative feedback on the product by applying a weight higher than the first exposure frequency and the second exposure frequency to the rating information.

The processor may be configured to obtain a first identification result by identifying positive feedback or negative feedback on the product by performing NLP that a first algorithm is applied to the user feedback, obtain a second identification result by identifying positive feedback or negative feedback on the product by performing NLP that a second algorithm is applied to the user feedback, and identify the user feedback as negative feedback based on at least one of the first identification result and the second identification result including negative feedback.

The processor may be configured to display a ratio of the positive feedback and the negative feedback on the keyword information by product specification through the display, and based on a keyword corresponding to a specific specification of the product being selected according to a user input, display at least a part of the user feedback including the keyword.

The processor may be configured to display at least one of a UI for selecting the website to perform the crawling and a UI for editing a keyword by the product specification through the display.

The processor may be configured to obtain a first analysis result by performing NLP that the first algorithm is applied to user feedback of a first language obtained by crawling the website, obtain a second analysis result by performing NLP that the second algorithm is applied to user feedback of a second language obtained by crawling the website, and identify the positive feedback or the negative feedback by synthesizing the obtained first and second analysis results.

The processor may be configured to identify each of a plurality of sentences included in the user feedback as a positive sentence or a negative sentence, and identify the user feedback as the positive feedback or the negative feedback based on a ratio of the number of the positive sentences to a total number of sentences, and a ratio of the number of the negative sentences to the total number of sentences, included in the user feedback.

A method of controlling an electronic apparatus storing keyword information by product specification, the method includes obtaining user feedback on the product by crawling a website, identifying positive feedback or negative feedback among the user feedback corresponding to the keyword information by product specification by performing natural language processing (NLP) to which at least two different algorithms are applied, and displaying a result of the identification.

The user feedback may include feedback title and feedback contents, wherein the identifying may include identifying a first exposure frequency of a first positive word and a first negative word, respectively, included in the feedback title by performing NLP on the feedback title, identifying a second exposure frequency of a second positive word and a second negative word, respectively, included in the feedback contents by performing NLP on the feedback contents, and identifying the user feedback as positive feedback or negative feedback on the product by applying a weight higher than the second exposure frequency to the first exposure frequency.

The user feedback may further include rating information with respect to the product, and the identifying may include identifying the user feedback as positive feedback or negative feedback on the product by applying a weight higher than the first exposure frequency and the second exposure frequency to the rating information.

The identifying may include obtaining a first identification result by identifying positive feedback or negative feedback on the product by performing NLP that a first algorithm is applied to the user feedback, obtaining a second identification result by identifying positive feedback or negative feedback on the product by performing NLP that a second algorithm is applied to the user feedback, and identifying the user feedback as negative feedback based on at least one of the first identification result and the second identification result including negative feedback.

The displaying may include displaying a ratio of the positive feedback and the negative feedback on the keyword information by product specification through the display, and based on a keyword corresponding to a specific specification of the product being selected according to a user input, display at least a part of the user feedback including the keyword.

The method may further include displaying at least one of a UI for selecting the website to perform the crawling and a UI for editing a keyword by the product specification through the display.

The identifying may include obtaining a first analysis result by performing NLP that the first algorithm is applied to user feedback of a first language obtained by crawling the website, obtaining a second analysis result by performing NLP that the second algorithm is applied to user feedback of a second language obtained by crawling the website, and identifying the positive feedback or the negative feedback by synthesizing the obtained first and second analysis results.

The identifying may further include identifying each of a plurality of sentences included in the user feedback as a positive sentence or a negative sentence, and identifying the user feedback as the positive feedback or the negative feedback based on a ratio of the number of the positive sentences to a total number of sentences, and a ratio of the number of the negative sentences to the total number of sentences, included in the user feedback.

Regarding a non-transitory computer readable medium storing computer instructions so that the electronic apparatus performs an operation when executed by a processor of the electronic apparatus according to an embodiment of the disclosure, the operation may include obtaining user feedback on the product by crawling a website, identifying positive feedback or negative feedback among the user feedback corresponding to the keyword information by product specification by performing natural language processing (NLP) to which at least two different algorithms are applied, and providing the identification result.

According to various embodiments of the disclosure as described above, positive feedback and negative feedback by product specification, and identification results with high accuracy can be provided.

DETAILED DESCRIPTION OF EXAMPLE EMBODIMENTS

The terms used in example embodiments will be briefly explained, and example embodiments will be described in greater detail with reference to the accompanying drawings.

Terms used in the disclosure are selected as general terminologies currently widely used in consideration of the configuration and functions of the disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

The example embodiments may vary, and may be provided in different example embodiments. Various example embodiments will be described with reference to accompanying drawings. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the disclosure, the specific description is omitted.

The terms such as "first," "second," and so on may be used to describe a variety of elements, but the elements should not be limited by these terms. The terms used herein are solely intended to explain specific example embodiments, and not to limit the scope of the disclosure.

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

The example embodiments of the disclosure will be described in greater detail below in a manner that will be understood by one of ordinary skill in the art. However, exemplary embodiments may be realized in a variety of different configurations, and not limited to descriptions provided herein. Also, well-known functions or constructions are not described in detail since they would obscure the invention with unnecessary detail.

Figure 1:
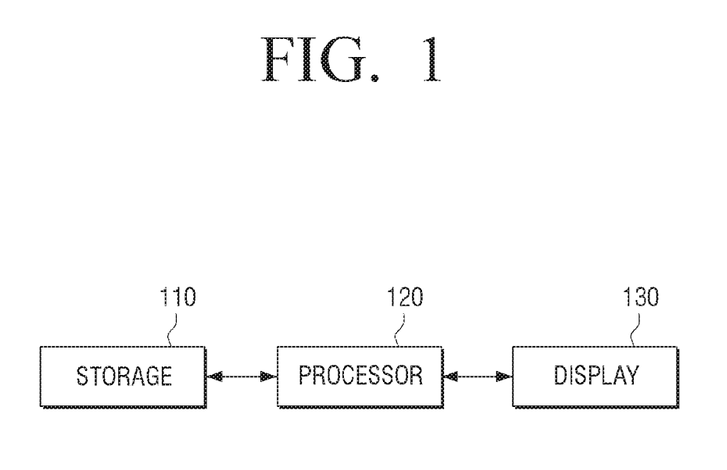
FIG. 1 is a block diagram illustrating an electronic apparatus according to an embodiment of the disclosure.

FIG. 1 is a block diagram illustrating an electronic apparatus according to an embodiment of the disclosure.

As illustrated in FIG. 1, an electronic apparatus 100 includes a storage 110, a processor 120 and a display 130.

The electronic apparatus 100 according to an embodiment of the disclosure may be a device capable of performing natural language processing (NLP). For example, it may refer to a user terminal device, a display device, a set-top box, a tablet personal computer (PC), smart phones, e-book reader, a desktop PC, a laptop PC, a workstation, a server, a personal digital assistant (PDA), a portable multimedia player (PMP), an MP3 player, or the like. Alternatively, the electronic apparatus 100 may refer to a system itself on which a cloud computing environment is built. However, it is not limited thereto, and the electronic apparatus 100 may be any device as long as it can perform NLP using deep learning.

The storage 110 may store keyword information by product specification. The specification of the product may refer to its inherent performance, color, design, weight, etc. of the product. For example, if the product is a laptop, the specifications of the laptop may include a display, a processor, a storage device, a weight, or the like. The keyword information by specification may include Wide, OLED, supported resolution, etc. with respect to a display, and 128 GB, 256 GB, SSD. HDD, etc. with respect to the storage. However, it is only an example and may store various specification information indicating unique characteristics of the product and keyword information by specification information. For example, specifications of a TV may refer to display, video, sound, design and features, keywords by specification may refer to a screen size, resolution, panel type, curved with respect to a display, HDR, 10 bit, dimming technology with respect to images, whether Dolby sound, RMS, and Bluetooth are supported with respect to the sound. As described below, keyword information by product specification may be updated and edited by a user, a manufacturer, etc., and the electronic apparatus 100 may update keyword information by product specification by communicating with an external server. In addition, the product is not limited to electronic products, and may refer to various types of products that can be purchased through internet shopping.

The processor 120 controls a general operation of the electronic apparatus 100.

The processor 120 may obtain user feedback on a product by crawling a website. The crawling may refer to programming that browses a website in an automated manner. The crawling may be referred to as a spidering, but will be referred to as crawling for convenience of description hereinafter.

The processor 120 may generate copies of pages of various websites using web crawling and store the generated copies in the storage 110. The website may refer to any website that can obtain user feedback on products. For example, the processor 120 may obtain user feedback on a product by crawling a predetermined shopping mall website. The processor 120 may crawl various products being sold on the website of the shopping mall and feedback (e.g., Review) written by the user on each product, and store them in the storage 110. However, it is not limited thereto, and the processor 120 may obtain user feedback by randomly crawling a user community and an unspecified website for a specific product in addition to a shopping mall website. The user feedback may refer to various types of opinions on a product written by the user, such as a user's evaluation, reviews, comments, reviews, etc. of the product. Hereinafter, for convenience of description, user feedback based on text will be assumed and described. However, it is not limited thereto, and the user feedback may be written in various forms such as videos, photos, images, or the like.

For example, the processor 120 may crawl a first website and store various web pages included in the first website in the storage 110, and perform indexing on the stored web pages. In addition, user feedback on a product may be obtained based on a URL of a web page. However, it is not limited thereto, and the processor 120 may obtain user feedback on each of a plurality of products by using various types of data analysis methods on the webpage obtained by crawling the website.

Also, the processor 120 may perform natural language processing (NLP) on the obtained user feedback. The NLP may refer to a series of processing processes that analyze and extract meaningful information from text.

The processor 120 may perform various types of NLP based on deep learning. For example, the processor 120 may analyze user feedback using a Recurrent Neural Network (RNN) and a Convolution Neural Network (CNN) learned NLP algorithm.

The processor 120 according to an embodiment of the disclosure may perform syntactic analysis on user feedback. For example, the processor 120 may analyze user feedback in a predetermined grammatical unit. The processor 120 may perform candidate syntactic parsing. Accordingly, the user feedback may be parsed in a sentence structure or word unit. The processor 120 may perform semantic analysis of the parsed data. The processor 120 may perform word sense disambiguation and derive a user intent. For example, the processor may derive a user's intention and output user feedback. However, this is only an example, and the processor 120 is not necessarily limited thereto to perform NLP. The processor 120 may perform NLP on user feedback using at least two different algorithms. The algorithm may refer to various types of NLP algorithms such as Stanford CoreNLP, Doc2Vec, Word2Vec, Samsung Find, or the like. In addition, the algorithm is not limited to the known NLP algorithm, and of course, it may refer to various types of NLP algorithms obtained according to machine learning results.

In particular, the processor 120 may perform NLP on user feedback, and identify positive feedback or negative feedback by product specification among user feedback corresponding to keyword information by specification stored in the storage 110.

According to an embodiment, user feedback for a first TV of a manufacturer A may include feedback for each specification of the first TV. For example, the user feedback may include positive or negative feedback with respect to displays among a plurality of specifications of the first TV, and include positive or negative feedback with respect to image quality, panel type, and supported resolution among the displays. The processor 120 may identify whether user feedback for each specification corresponds to positive or negative based on keyword information.

For example, it may be assumed that 3D, image quality, resolution, panel type, etc. are stored as keyword information in the storage 110 for specifications of a TV display.

The processor 120 may perform NLP on user feedback for the first TV, and identify whether user feedback for each of 3D, image quality, resolution, and panel type is positive feedback or negative feedback based on keyword information. The processor 120 may identify positive feedback or negative feedback for each specification in the user feedback for the first TV, and provide the identification result to the user.

The processor 120 according to an embodiment of the disclosure may perform NLP on user feedback using at least two different algorithms. For example, the processor 120 may perform NLP using only one algorithm for user feedback, or may perform NLP using at least two different algorithms and identify positive feedback or negative feedback among user feedback corresponding to keyword information by product specification.

According to an embodiment of the disclosure, the processor 120 may perform NLP applying at least two different algorithms among Stanford CoreNLP, Doc2Vec, Word2Vec, and Samsung Find to identify positive feedback or negative feedback among user feedback corresponding to keyword information by product specification.

The processor 120 may provide identification results. For example, the processor 120 may provide a ratio of positive feedback and negative feedback for each keyword corresponding to each specification of the product, and when a keyword corresponding to a specific specification of the product is selected according to a user input, the processor may provide at least a portion of the user feedback including a keyword.

The processor 120 according to an embodiment of the disclosure may identify user feedback as positive feedback or negative feedback. In other words, the processor 120 may identify the user feedback itself as positive feedback or negative feedback.

The processor according to an embodiment may perform NLP that a first algorithm is applied to user feedback to identify positive feedback or negative feedback on a product, and obtain a first identification result, and may perform NLP that a second algorithm is applied to user feedback to identify positive feedback or negative feedback on the product, and obtain a second identification result. If at least one of the first identification result and the second identification result includes negative feedback, the processor may identify the user feedback as negative feedback. For example, the processor may identify the user feedback as positive feedback or negative feedback based on the following processing.

If (Stanford CoreNLP classifies as negative OR Doc2Vec classifies as negative OR Samsungs Find classifies as negative)
  Final sentiment is 'negative feedback'
Else
  Final sentiment is 'positive feedback'

However, it is not limited thereto, and if NLP is performed on user feedback using the plurality of NLP algorithms, the processor 120 may obtain identification results for each of the plurality of NLP algorithms, and identify user feedback as positive feedback or negative feedback according to a result taking a majority of a plurality of identification results. Meanwhile. Stanford CoreNLP, Doc2Vec, and Samsungs Find are examples of NLP algorithms, and the processor 120 may obtain identification results for user feedback based on various types of NLP algorithms.

The user feedback according to an embodiment of the disclosure may include a feedback title and feedback contents. The feedback title may refer to a title, a summary, or the like with respect to user reviews, comments, reviews, or the like. The feedback title may briefly summarize user's evaluation, reviews of products, etc., and the feedback contents may include specific evaluations of products.

The processor 120 according to an embodiment may apply different weights to the first identification result obtained by performing NLP on the feedback title and the second identification result obtained by performing NLP on the feedback contents, and identify the user feedback as positive feedback or negative feedback. For example, the processor 120 may perform NLP on the feedback title to identify a first exposure frequency of each of a first positive word and a first negative word included in the feedback title, and perform NLP on the feedback contents to identify a second exposure frequency of each of a second positive word and a second negative included in the feedback title. If an exposure frequency of the positive word is relatively higher than an exposure frequency of the negative word, the user feedback may be identified as the positive feedback. For example, the processor 120 may apply a relatively higher weight than the second exposure frequency to the first exposure frequency obtained by performing NLP on the feedback title in which the user's evaluation, reviews, or the like are briefly summarized.

The user feedback on a first product may assume that the feedback title is "the first product with excellent performance", and, the feedback contents is "a second product with bad image quality compared to the first product". Although both the feedback title and the feedback contents are positive feedbacks on the first product, if the same weight is applied to the identification result obtained by performing NLP on the feedback title and the feedback contents, the user feedback may be incorrectly determined as positive feedback or negative feedback due to a negative word included in the feedback contents (e.g., bad image quality).

The processor 120 according to an embodiment of the disclosure may apply a weight that is relatively higher than the second exposure frequency obtained by performing NLP on the feedback contents to the first exposure frequency obtained by performing NLP on the feedback title. For example, the processor 120 may apply a relatively high weight on a first NLP performance result corresponding to "the first product with excellent performance" than a second NLP performance result corresponding to "the second product with worse image quality than the first product, and identify user feedback on products as positive feedback or negative feedback, so that an accuracy may be improved.

User feedback according to an embodiment may further include rating information. The rating information may refer to numerically intuitive feedback on the product. For example, if a satisfaction on a product with a perfect score of 10 and a satisfaction on a product with a 5-star rating are described as feedback on a product, the processor 120 may identify user feedback as positive feedback or negative feedback based on rating information. The rating information may be referred to as a rating system, etc., hereinafter, it will be collectively referred to as rating information. However, a numerical feedback is an embodiment, and the rating information may be expressed using alphabets such as A, B, C, D, etc., and may also be expressed using symbols, or the like, indicating satisfaction/dissatisfaction on the product.

The processor 120 may identify user feedback as positive feedback or negative feedback by applying a high weight to the rating information on a product. For example, the processor may apply the feedback title included in the user feedback, the first exposure frequency on each of the feedback contents, a first weight, and a third weight higher than a second weight to the rating information, and identify the user feedback as positive feedback or negative feedback.

According to an embodiment, the most intuitive information to identify whether the user feedback is positive feedback or negative feedback on the product may be rating information, feedback title, and feedback contents in order. Based on this order, the processor 120 may apply a highest weight to the rating information, and obtain an identification result by applying a lowest weight to the feedback contents.

The processor 120 according to an embodiment of the disclosure may crawl a plurality of websites using different languages. The processor 120 may identify positive feedback or negative feedback by performing NLP to which NLP algorithm optimized for each language is applied. For example, the processor 120 may obtain a first analysis result by performing NLP that a first NLP algorithm is applied to user feedback of a first language, and obtain a second analysis result by performing NLP that a second NLP algorithm is applied to user feedback of a second language. The processor 120 may identify positive feedback or negative feedback by synthesizing the first and second analysis results.

For example, since different NLP algorithms must be applied to different languages such as English, Japanese, Chinese, Korean, or the like, the processor 120 may obtain an analysis result by performing NLP that NLP algorithm corresponding to each language is applied to user feedback obtained by crawling a website, and identify the user feedback as positive feedback or negative feedback by synthesizing the obtained analysis result.

The processor 120 according to an embodiment of the disclosure may identify each of a plurality of sentences included in the user feedback as a positive sentence or a negative sentence, and identify the user feedback as positive feedback or negative feedback based on a ratio of the number of positive sentences with respect to the total number of sentences included in the user feedback and a ratio of the number of negative sentences with respect to the total number of sentences included in the user feedback.

Figure 2:
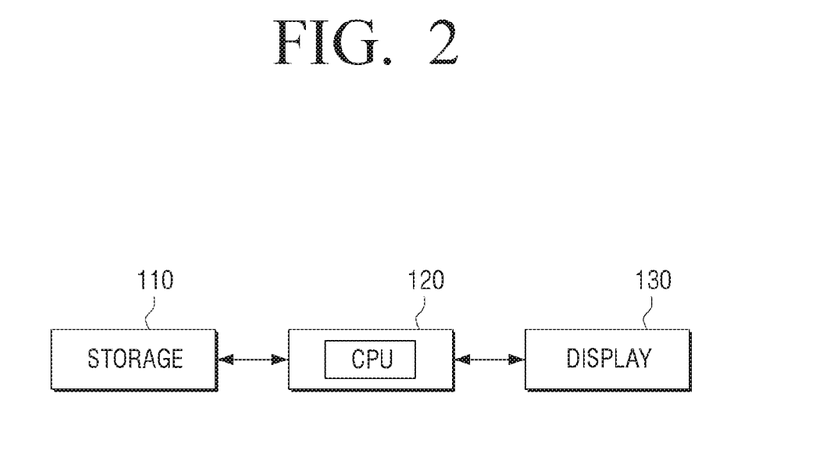
FIG. 2 is a block diagram illustrating a structure of an electronic apparatus, according to an embodiment of the disclosure.

FIG. 2 is a block diagram illustrating a structure of an electronic apparatus, according to an embodiment of the disclosure.

Referring to FIG. 2, the electronic apparatus 100 includes a storage 110, a processor 120, and a display 130. In FIG. 2, the elements shown in FIG. 1 will not be described in detail.

The processor 120 may control the overall operation of the electronic apparatus 100.

The processor 120 may include one or more of a digital signal processor (DSP), a central processing unit (CPU), a controller, application processor (AP), a communication processor (CP), or an ARM processor, or may be defined by the corresponding term.

The processor 120 may include, for example, and without limitation, a CPU, a ROM (or a non-volatile memory) in which a control program for controlling the electronic apparatus 100 is stored and a RAM (or volatile memory) used to store data input from outside of the electronic apparatus 100 or used as a storage area corresponding to various operations performed in the electronic apparatus 100.

The CPU is configured to access the storage 110 and perform booting using an operating system (OS) stored in the storage 110. In addition, the CPU may perform various operations using various programs, content, data, etc. which are stored in the storage 110.

The storage 110 stores various data such as an operating system (O/S) software module for driving the electronic apparatus 100, and various data like various kinds of multimedia contents.

The storage 110 may be implemented as an internal memory such as a ROM, RAM, etc. included in the processor 120 or may be implemented as a memory separate from the processor 120. The storage 110 may be implemented in the form of a memory embedded in the electronic apparatus 100 according to a purpose of data storage, or may be implemented in a form of a memory detachable from the electronic apparatus 100. For example, data for driving the electronic apparatus 100 may be stored in a memory embedded in the electronic apparatus 100, and data for an extension function of the electronic apparatus 100 may be stored in a detachable from the electronic apparatus 100. Meanwhile, the memory embedded in the electronic apparatus 100 may be implemented in the form of non-volatile memory, volatile memory, a hard disk drive (HDD), solid state drive (SSD), or the like, and a memory detachable from a sound output apparatus 100 may be implemented in the form of a memory card (e.g., micro SD card, USB memory, etc.), an external memory (e.g., USB memory) connectable to a USB port.

The display 130 may be implemented with various types of displays such as a liquid crystal display (LCD), an organic light emitting diode (OLED), a liquid crystal on silicon (LCoS), and a digital light processing (DLP). However, it is not limited thereto, and may be implemented with various types of displays capable of displaying images.

The display 130 may output identification results under the control of the processor 120. According to an embodiment of the disclosure, the display 130 may display a ratio of positive feedback and negative feedback on keyword information by product specification under the control of the processor 120. In addition, when a keyword corresponding to a specific specification of a product is selected according to user input, the display 130 may display at least a portion of the user feedback including the selected keyword.

The display 130 according to an embodiment may provide at least one of a UI for selecting a website to perform a crawl under the control of the processor 120 and a UI for editing a keyword by product specification.

The communicator is an element to perform communication with various types of external devices according to various types of communication methods. The communicator includes a Wi-Fi chip, Bluetooth chip, wireless communication chip, NFC chip and the like. In addition, the processor 110 may perform communication with various external devices using the communicator.

Especially, the Wi-Fi chip and Bluetooth chip each performs communication in the Wi-Fi method, and Bluetooth method, respectively. When the WI-FI chip or the Bluetooth chip is used, various connection information such as SSID and session key may be first exchanged, communication may be connected by using the connection information, and various information may be exchanged. The wireless communication chip 153 indicates a chip which performs communication in accordance with various communication standards such as IEEE, ZigBee, 3rd generation (3G), 3rd generation partnership project (3GPP), and long term evolution (LTE) or the like. The NFC chip 154 refers to a chip that operates using a Near Field Communication (NFC) method using a 13.56 MHz band among various RF-ID frequency bands, such as 135 kHz, 13.56 MHz, 433 MHz, 860 to 960 MHz, and 2.45 GHz.

The processor 120 may obtain user feedback on a product by crawling a website through the communicator.

According to an embodiment of the disclosure, the processor 120 may receive keyword information by product specification from an external device through a communicator, store the keyword information in the storage 10, or update pre-stored information.

The processor 120 may crawl the website to obtain user feedback, and perform NLP to identify positive feedback or negative feedback among the user feedback, but according to another embodiment of the disclosure, the processor 120 may receive an identification result from an external server through the communicator. Even if the processor 120 does not perform crawling and NLP on its own, the electronic apparatus 100 may receive the identification result obtained by the external server performing the NLP through the communicator and display the identification result.

The user interface receives various user interactions. Herein, the user interface 160 may be implemented in various forms according to implementing embodiments of the electronic apparatus 100. For example, the user interface may refer to a button provided in the electronic apparatus 100, a microphone that receives a user voice, a camera sensing a user motion, or the like. Further, in response to the electronic apparatus 100 being implemented to be an electronic apparatus based on touch, the user interface may be implemented to be touch screen that forms an interlayer structure with a touch pad. In this case, the user interface 160 may be used as the above-described display 130.

For example, when a keyword corresponding to a specific specification of a product is selected according to a user input through the user interface, the processor 120 may provide at least a portion including a keyword selected in user feedback.

The audio processor 170 may be configured to perform processing on audio data. The audio processor 170 may perform various processing with respect to audio data, such as decoding, amplification, noise filtering, or the like.

Figure 3:
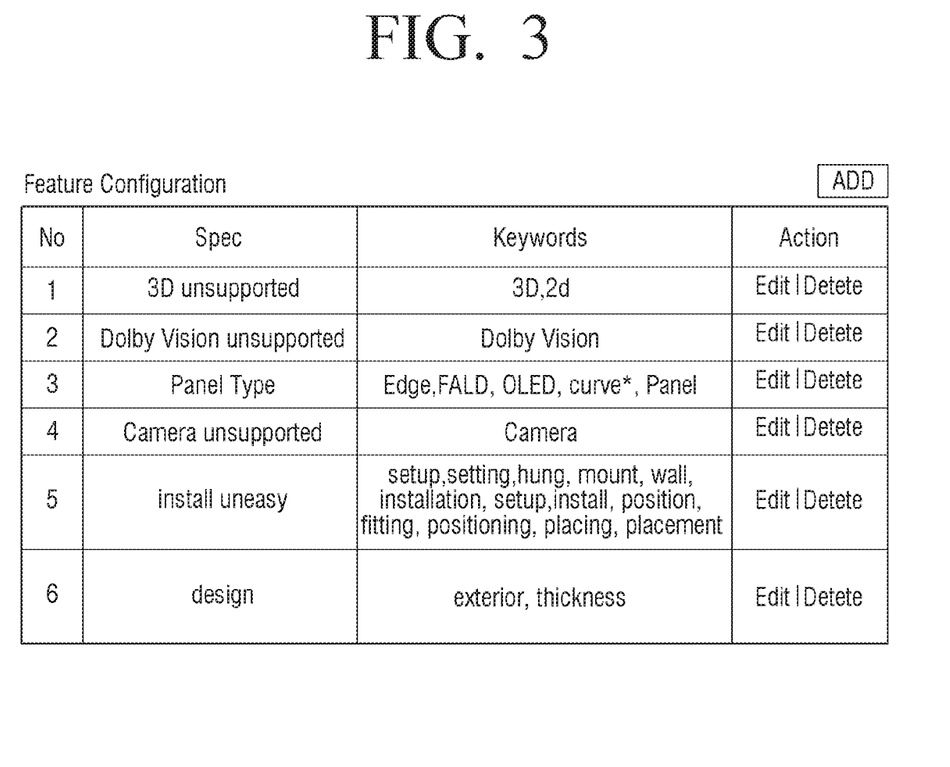
FIG. 3 is a view illustrating keyword information by product specification according to an embodiment of the disclosure.

FIG. 3 is a view illustrating keyword information by product specification according to an embodiment of the disclosure.

According to FIG. 3, the electronic apparatus 100 may store keyword information by product specification. Herein, the specification may refer to a category for describing a product. For example, a TV product may be described as specifications such as screen standards, image quality, sound, support terminals, or the like. Each specification may include more detailed keywords. For example, the screen specification may include keywords such as screen size, resolution, shape (e.g., curved or flat), viewing angle, LED method, or the like. In addition, the image quality may include keywords such as HDR, panel type, dimming, or the like. However, this is for convenience of description and is not limited thereto. The electronic apparatus 100 may store various specifications and keyword information by product specification not illustrated in FIG. 3.

Although FIG. 3 illustrates TV product specifications and keyword information by specifications in a table, the electronic apparatus 100 may store keyword information by product specification of various types of products. For example, the electronic apparatus 100 may store keyword information by product specification with respect to a vehicle, such as an engine, a transmission, a fuel type, an engine displacement, a driving method, maximum torque, or the like The electronic apparatus 100 may perform NLP on user feedback obtained by crawling a website and identify positive feedback or negative feedback by specification based on keyword information.

According to an embodiment of the disclosure, the electronic apparatus 100 may perform NLP with respect to a sentence including HDR and panel type with respect to image quality in the user feedback, and identify positive feedback or negative feedback for the image quality among the user feedback. The electronic apparatus 100 may provide an identification result.

According to an embodiment of the disclosure, the electronic apparatus 100 may display a UI for editing keywords by product specifications. As illustrated in FIG. 3, keywords for identifying positive feedback or negative feedback in user feedback may be added, edited, and deleted.

Figure 4:
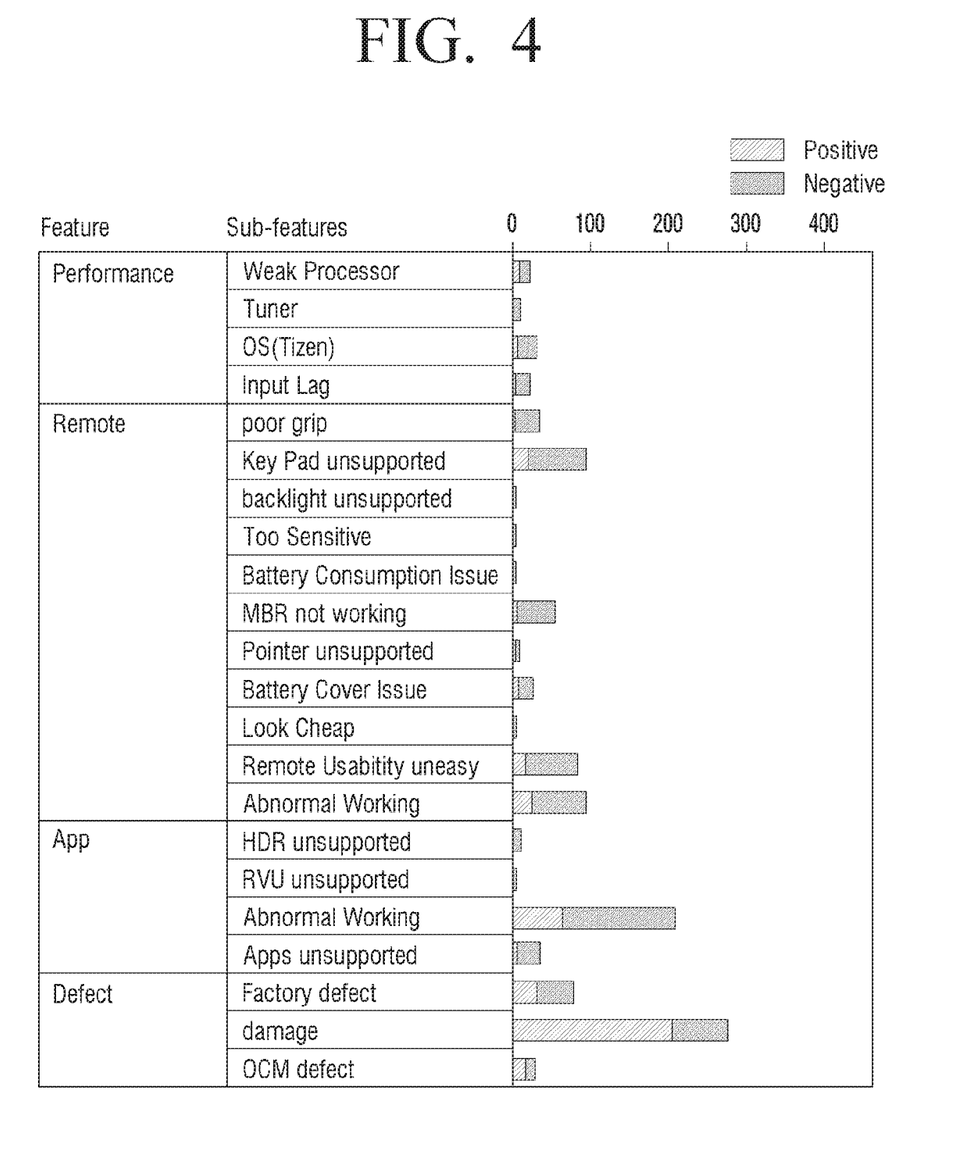
FIG. 4 is a view illustrating positive and negative feedback by product specification according to an embodiment of the disclosure.

FIG. 4 is a view illustrating positive and negative feedback by product according to an embodiment of the disclosure.

According to FIG. 4, the electronic apparatus 100 may identify positive feedback or negative feedback by product specification among user feedback based on keyword information, and an identification result may be provided to the user.

For example, if the product is a display apparatus, the electronic apparatus 100 may store a plurality of specifications (e.g., Feature) and keyword by specification (e.g., Sub-feature) information with respect to the display apparatus. The electronic apparatus 100 may perform NLP on the obtained user feedback and identify positive feedback or negative feedback by keyword. For example, the electronic apparatus 100 may perform NLP based on keyword poor grip with respect to a remote and provide a ratio of positive feedback and negative feedback.

As illustrated in FIG. 4, the electronic apparatus 100 may acquire and display a ratio of positive feedback and negative feedback with respect to keyword information by product specification. The electronic apparatus 100 may provide a ratio of positive feedback and negative feedback by keyword in addition to the ratio of positive feedback and negative feedback by specification.

Figure 5:
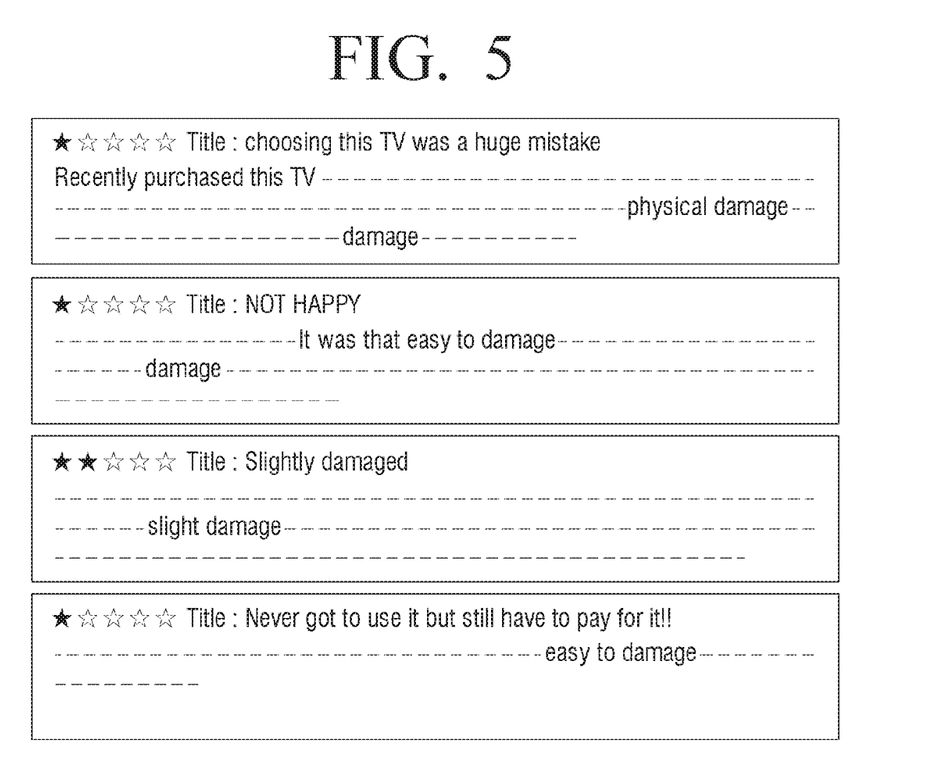
FIG. 5 is a view illustrating user feedback according to an embodiment of the disclosure.

FIG. 5 is a view illustrating user feedback according to an embodiment of the disclosure.

According to FIG. 5, when a keyword corresponding to a specific specification of a product is selected according to a user input, the electronic apparatus 100 may provide at least a part of feedback of the user including the keyword. For example, a keyword "damage" is selected according to the user input, the electronic apparatus 100 may display user feedback including "damage" from user feedback obtained by crawling a website.

According to an embodiment, a negative feedback and the "damage" is selected according to a user input, the electronic apparatus 100 may display a part of the user feedback including the negative feedback with respect to the "damage".

Accordingly, the electronic apparatus 100 may provide a ratio of positive feedback and negative feedback by keyword corresponding to each specification to the user. In addition, the electronic apparatus may provide a part of user feedback including a keyword selected according to a user input.

Figure 6:
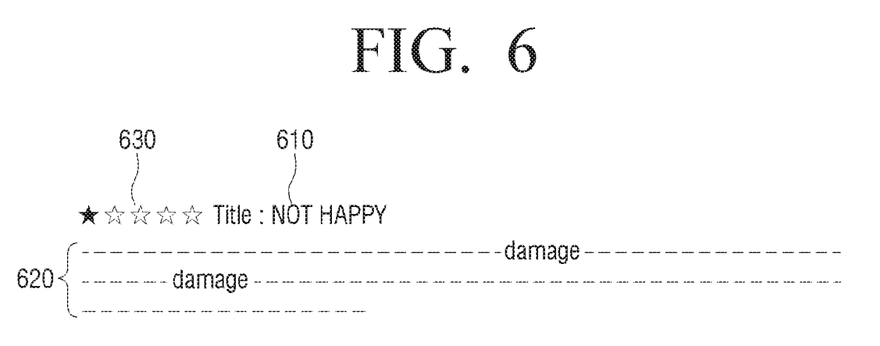
FIG. 6 is a view illustrating user feedback including a selected keyword according to an embodiment of the disclosure.

FIG. 6 is a view illustrating user feedback including a selected keyword according to an embodiment of the disclosure.

As illustrated in FIG. 6, user feedback may be divided into a plurality of areas. A first area may refer to a feedback title 610, a second area may refer to feedback contents 620, and a third area may refer to rating information 630. The feedback title 610 may refer to a title, summary, etc. with respect to the user feedback. The feedback title 610 may be a brief summary of the user's evaluation, reviews or the like with respect to a product.

The feedback contents 620 may refer to a detailed evaluation or review with respect to products. The electronic apparatus 100 may perform NLP on the feedback contents 620 to identify positive feedback or negative feedback by specification.

Also, the electronic apparatus 100 may perform NLP on the feedback title 610 and the feedback contents 620, respectively, to identify user feedback as positive feedback or negative feedback. For example, the electronic apparatus 100 may perform NLP on the feedback title 610 to identify a first exposure frequency of a first positive word and a first negative word, respectively, included in the feedback title 610, and perform NLP on the feedback contents 620 to identify a second exposure frequency of a second positive word and a second negative word, respectively, included in the feedback contents 620. The exposure frequency may refer to an intent of a sentence by performing NLP on the feedback title 610 and the feedback contents 620, respectively.

The electronic apparatus 100 may identify user feedback as positive feedback or negative feedback with respect to a product by applying a weight higher than the second exposure frequency to the first exposure frequency. A relatively higher weight is given to the exposure frequency (or intent of the sentence) of the feedback title 610 in which a main content of the user feedback is summarized and implicitly expressed than the feedback contents 620 including a plurality of sentences, such that the electronic apparatus 100 may identify whether the user feedback is positive feedback or negative feedback with high accuracy.

According to an embodiment of the disclosure, if rating information 630 with respect to a product is included in the user feedback, the electronic apparatus 100 may identify the user feedback as positive feedback or negative feedback with respect to the product by applying a higher weight than an identification result with respect to the feedback title 610 and the feedback contents 620 to the rating information 630.

Since the rating information 630 may refer to an index that intuitively indicates the user's evaluation, emotion, or the like of the product, the electronic apparatus 100 may assign a relatively higher weight to the rating information 630 to identify whether the user feedback is positive or negative.

According to another embodiment, it may assume a case when it is hard the electronic apparatus 100 to identify whether the user feedback is positive or negative by using the rating information 630. For example, it may assume that when a total of 5 stars is a perfect score, the user's rating information 630 is 3 stars, or when a total of 10 stars is a perfect score, and the user's rating information 630 is 5 stars. In addition to the rating information 630, the electronic apparatus 100 may identify the user feedback as positive feedback or negative feedback based on a ratio of the number of positive sentences to the total number of sentences included in the user feedback and a ratio of the number of negative sentences to the total number of sentences.

Figure 7:
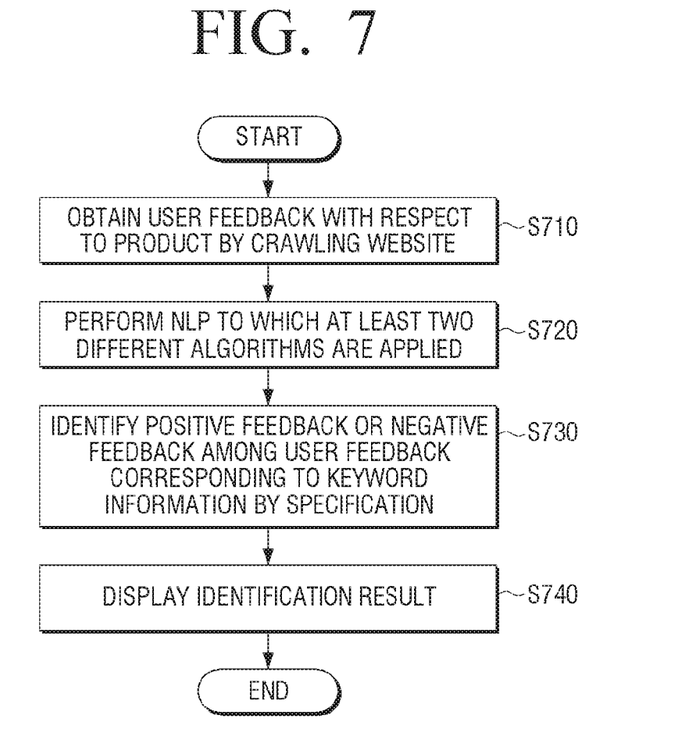
FIG. 7 is a flowchart illustrating a method of controlling an electronic apparatus according to an embodiment of the disclosure.

FIG. 7 is a flowchart illustrating a method of controlling an electronic apparatus according to an embodiment of the disclosure.

As illustrated in FIG. 7, the method of controlling the electronic apparatus in which keyword information by product specification is stored may obtain user feedback with respect to a product by crawling a website (S710).

The method may perform Natural Language Processing (NLP) to which at least two different algorithms are applied (S720) and identify user feedback corresponding to the keyword information by specification as positive feedback or negative feedback (S730).

A result of the identification is displayed (S740).

User feedback according to an embodiment may include a feedback title and feedback contents, and the operation of performing NLP S720 and the identifying NLP S730 may include identifying a first exposure frequency of a first positive word and a first negative word, respectively, included in the feedback title by performing NLP on the feedback title, and identifying a second exposure frequency of a second positive word and a second negative word, respectively, included in the feedback contents by performing NLP on the feedback contents, and identifying the user feedback as positive feedback or negative feedback with respect to the product by applying a higher weight than the second exposure frequency to the first exposure frequency.

The user feedback may further include rating information on the product.

The identifying may apply a weight higher than the first and second exposure frequencies to the rating information, and identify positive feedback or negative feedback on the user feedback.

The identifying may include obtaining a first identification result by identifying positive feedback or negative feedback on the product by performing NLP that a first algorithm is applied to the user feedback, and obtaining a second identification result by identifying positive feedback or negative feedback on the product by performing NLP that a second algorithm is applied to the user feedback, and identifying the user feedback as negative feedback if at least one of the first identification result and the second identification result includes negative feedback.

The displaying operation S740 according to an embodiment may include displaying a ratio of positive feedback and negative feedback on keyword information by product specification, and if a keyword corresponding to a specific specification of the product according to a user input displaying at least a part of the user feedback including the keyword.

The operation of displaying S740 may include displaying at least one of a UI for selecting a website for crawling and a UI for editing the keyword by product specification.

The identifying may include obtaining a first analysis result by performing NLP applying the first algorithm to the user feedback of a first language obtained by crawling a first website, obtaining a second analysis result by performing NLP applying the second algorithm to the user feedback of a second language obtained by crawling a second website, and identifying positive feedback or negative feedback by synthesizing the first and second analysis results.

Also, the identifying may include identifying each of a plurality of sentences included in user feedback as a positive sentence or a negative sentence, and identifying the user feedback as positive feedback or negative feedback based on a ratio of the number of positive sentences to the total number of sentences included in the user feedback and a ratio of the number of negative sentences to the total number of sentences included in the user feedback.

Various exemplary embodiments described above may be embodied in a recording medium that may be read by a computer or a similar apparatus to the computer by using software, hardware, or a combination thereof. The embodiments described herein may be implemented by the processor itself in some cases. In a software configuration, various embodiments described in the specification such as a procedure and a function may be embodied as separate software modules. The software modules may respectively perform one or more functions and operations described in the present specification.

Methods of controlling a display apparatus according to various exemplary embodiments may be stored on a non-transitory readable medium. Computer instructions stored in the non-transitory readable medium may allow a specific device to perform a processing operation in accordance with various embodiments described above when executed by a processor.

The non-transitory computer readable recording medium refers to a medium that stores data and that can be read by devices. For example, the non-transitory computer-readable medium may be CD, DVD, a hard disc, Blu-ray disc, USB, a memory card, ROM, or the like.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic apparatus comprising:
   a display;
   a storage in which keyword information regarding each of a plurality of features of a product is stored; and
   a processor configured to:
   obtain user feedback on the product by crawling a website;
   perform Natural Language Processing (NLP) by applying at least two different algorithms to the user feedback corresponding to specific keyword information;
   identify whether the user feedback is positive feedback or negative feedback regarding a feature corresponding to the specific keyword information from among the plurality of features based on a result of the performed NLP, and
   display a result of the identification through the display,
   wherein the processor is configured to
      obtain a first identification result by identifying positive feedback or negative feedback on the product by performing NLP using a first algorithm applied to the user feedback,
      obtain a second identification result by identifying positive feedback or negative feedback on the product by performing NLP using a second algorithm applied to the user feedback, and
      identify the user feedback as negative feedback based on at least one of the first identification result and the second identification result including negative feedback,
      wherein the first algorithm and the second algorithm operate in a same natural language.

2. The apparatus of claim 1, wherein the user feedback includes feedback title and feedback contents,
   wherein the processor is configured to identify a first exposure frequency of a first positive word and a first negative word, respectively, included in the feedback title by performing NLP on the feedback title,
   identify a second exposure frequency of a second positive word and a second negative word, respectively, included in the feedback contents by performing NLP on the feedback contents, and
   identify the user feedback as positive feedback or negative feedback on the product by applying a weight higher than the second exposure frequency to the first exposure frequency.

3. The apparatus of claim 2, wherein the user feedback further comprises rating information with respect to the product, and
   wherein the processor is configured to identify the user feedback as positive feedback or negative feedback on the product by applying a weight higher than the first exposure frequency and the second exposure frequency to the rating information.

4. The apparatus of claim 1, wherein the processor is configured to display a ratio of the positive feedback and the negative feedback regarding the feature corresponding to the specific keyword information through the display, and based on a keyword corresponding to a specific feature of the product being selected according to a user input, display at least a part of the user feedback including the keyword.

5. The apparatus of claim 1, wherein the processor is configured to display at least one of a UI for selecting the website to perform the crawling and a UI for editing a keyword corresponding to a specific feature among the plurality of features through the display.

6. The apparatus of claim 1, wherein the processor is configured to obtain a first analysis result by performing NLP using the first algorithm applied to user feedback of a first language obtained by crawling the website,
   obtain a second analysis result by performing NLP using the second algorithm applied to user feedback of a second language obtained by crawling the website, and
   identify the positive feedback or the negative feedback by synthesizing the obtained first and second analysis results.

7. The apparatus of claim 1, wherein the processor is configured to identify each of a plurality of sentences included in the user feedback as a positive sentence or a negative sentence, and
   identify the user feedback as the positive feedback or the negative feedback based on a ratio of the number of the positive sentences to a total number of sentences, and a ratio of the number of the negative sentences to the total number of sentences, included in the user feedback.

8. A method of controlling an electronic apparatus storing keyword information regarding each of a plurality of features constituting a product,
   the method comprising:
   obtaining user feedback on the product by crawling a website;
   performing Natural Language Processing (NLP) by applying at least two different algorithms to the user feedback corresponding to specific keyword information;
   identifying whether the user feedback is positive feedback or negative feedback regarding a feature corresponding to the specific keyword information from among the plurality of features based on a result of the perform NLP; and
   displaying a result of the identification, and
   wherein the identifying comprises
      obtaining a first identification result by identifying positive feedback or negative feedback on the product by performing NLP using a first algorithm applied to the user feedback,
      obtaining a second identification result by identifying positive feedback or negative feedback on the product by performing NLP using a second algorithm applied to the user feedback and identifying the user feedback as negative feedback based on at least one of the first identification result and the second identification result including negative feedback,
wherein the first algorithm and the second algorithm operate in a same natural language.

9. The method of claim 8, wherein the user feedback includes feedback title and feedback contents,
wherein the identifying comprises:
identifying a first exposure frequency of a first positive word and a first negative word, respectively, included in the feedback title by performing NLP on the feedback title;
identifying a second exposure frequency of a second positive word and a second negative word, respectively, included in the feedback contents by performing NLP on the feedback contents; and
identifying the user feedback as positive feedback or negative feedback on the product by applying a weight higher than the second exposure frequency to the first exposure frequency.

10. The method of claim 9, wherein the user feedback further comprises rating information with respect to the product, and
wherein the identifying comprises identifying the user feedback as positive feedback or negative feedback on the product by applying a weight higher than the first exposure frequency and the second exposure frequency to the rating information.

11. The method of claim 8, wherein the displaying comprises:
displaying a ratio of the positive feedback and the negative feedback regarding the feature corresponding to the specific keyword information through the display; and
based on a keyword corresponding to a specific feature of the product being selected according to a user input, display at least a part of the user feedback including the keyword.

12. The method of claim 8, further comprising displaying at least one of a UI for selecting the website to perform the crawling and a UI for editing a keyword corresponding to a specific feature among the plurality of features through the display.

13. The method of claim 8, wherein the identifying comprises:
obtaining a first analysis result by performing NLP using the first algorithm applied to user feedback of a first language obtained by crawling the website;
obtaining a second analysis result by performing NLP using the second algorithm applied to user feedback of a second language obtained by crawling the website; and
identifying the positive feedback or the negative feedback by synthesizing the obtained first and second analysis results.

\* \* \* \* \*